(No Model.)
C. G. LEVISON.
FISHING FLY BOOK.
No. 294,888. Patented Mar. 11, 1884.
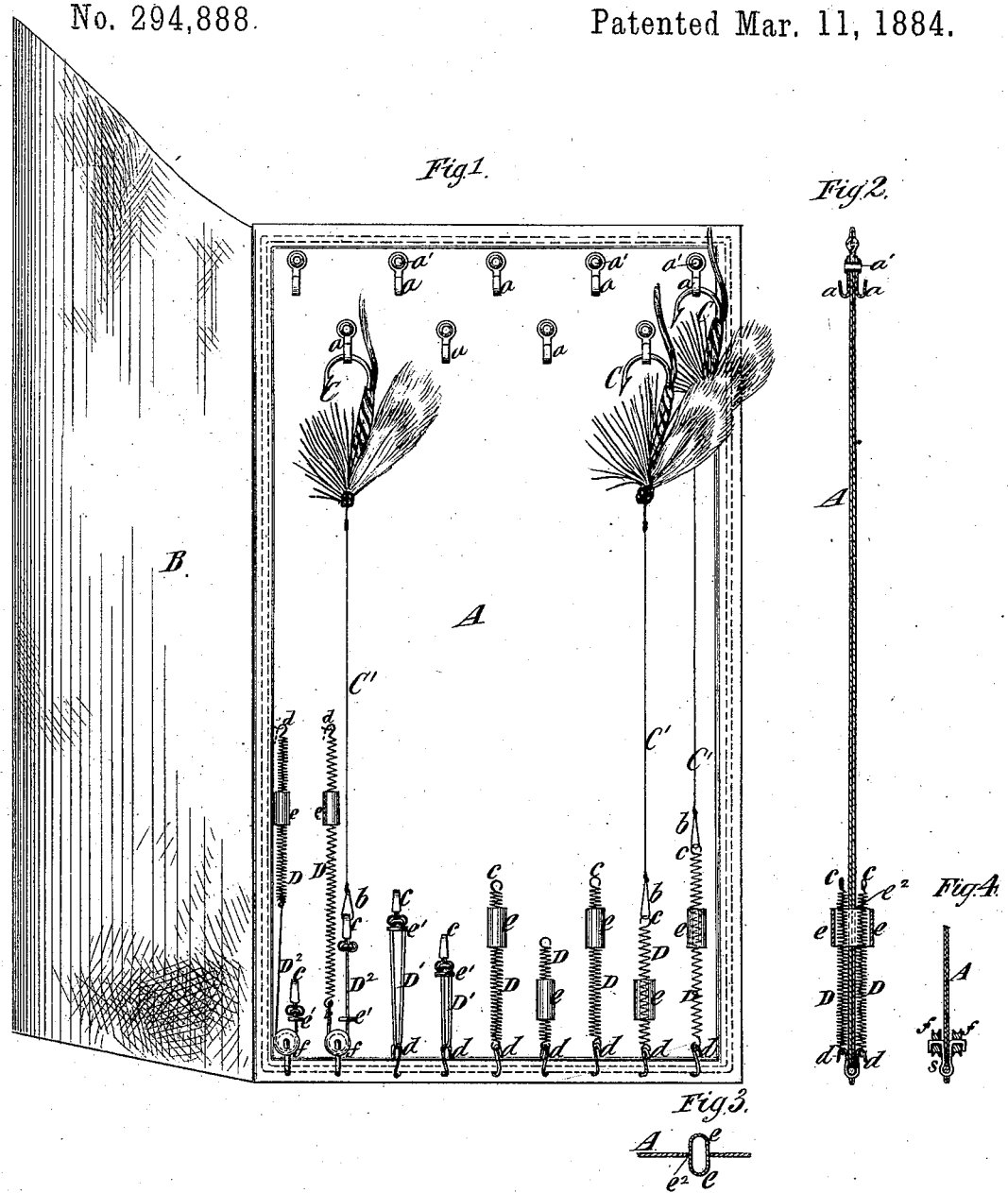
Witnesses
Ed. L. Moran
Chandler Hall
Inventor
Chancellor G. Levison
by his Attorneys
Brown & Hall

UNITED STATES PATENT OFFICE.

CHANCELLOR G. LEVISON, OF BROOKLYN, NEW YORK, ASSIGNOR TO THOMAS B. MILLS, OF SAME PLACE.

FISHING-FLY BOOK.

SPECIFICATION forming part of Letters Patent No. 294,888, dated March 11, 1884.

Application filed December 20, 1883. (No model.)

*To all whom it may concern:*

Be it known that I, CHANCELLOR G. LEVISON, of Brooklyn, in the county of Kings and State of New York, have invented a new and useful Improvement in Fly-Books, of which the following is a specification.

Fly-books, as commonly made, are provided at one end of the leaves with fixed hooks or clips, into which the fly-hooks are hooked, and at the other end of the leaves with spring-retainers, which are provided with hooks, on which the loops at the end of the snells are secured. These retainers are elastic, so that they will hold the snells stretched taut, and they usually are formed by rubber bands or spiral springs of light wire.

My invention relates to fly-books which are provided with elastic or spring retainers of the kinds above referred to, and its several features will be hereinafter fully described, and pointed out in the claims.

In the accompanying drawings, Figure 1 represents a fly-book embodying my invention, the cover being open. Fig. 2 is a longitudinal section of a leaf of the book, and Fig. 3 is a transverse section of a portion of the leaf. Fig. 4 is a similar transverse section, illustrating one mode of providing for the attachment of the retainer.

Similar letters of reference designate corresponding parts in all the figures.

A designates the leaf of the book, and B the cover thereof. The leaf may be strengthened around the edge by any suitable means, as is common in fly-books.

To the leaf A at one end (the top) are secured hooks or clips *a*, on which the fly-hooks C may be hooked; and the hooks or clips *a*, which are coincident with each other on opposite sides of the leaf A, may be secured thereto by the same rivet or eyelet *a'*, or other means, as shown in Fig. 2. The fly-hooks C are provided with the usual gut snells, C', in the ends of which are loops *b*. The looped ends of the snells C' are held by elastic or spring retainers, so as to keep them taut. Rubber loops or spiral springs of light wire are usually employed for the retainers, and I may use either of them in carrying out my invention.

D designates the retainers which consist of spiral springs, and D' designates those which consist of india-rubber loops or cords. I do not contemplate using two kinds of retainers on one leaf, although I have here shown them for purpose of illustration. I prefer to use retainers consisting of spiral springs, as when they consist of india-rubber the sulphur used in vulcanizing the rubber is liable to corrode the metal hooks *c*, with which all the retainers are provided, even though the rubber be specially prepared and treated as it now is. The retainers D D' are permanently secured at one end to hooks or clips *d*, and at their other ends are the hooks *c*, which hold the looped ends of the snells C'. I have shown the hooks or clips *a*, which hold the fly-hooks C, as arranged in two rows extending across the leaf, the hooks or clips *a* in each row alternating with or arranged opposite the spaces between the hooks or clips in the other row. As the snells C' are approximately uniform in length, it is necessary, in order to hold them properly, to use retainers of different lengths, or retainers of uniform length secured to the leaf at different points. I have here shown the retainers as of different lengths, alternately long and short, and the hooks or clips *d*, to which they are attached, are all arranged in a single row or line across the leaf.

When the snells C' are taken off from the retainers, some means are usually employed to hold the retainers in position and prevent them from becoming disarranged or entangled. The means which I employ for this purpose consists of separate eye-guides—one for each retainer—through which the retainers are severally passed, and by which they are held and guided in elongating and contracting. I have here shown two forms of eye-guides, *e e'*. The eye-guides *e* for the spiral-spring retainers D each consists of a short tube, through which the retainer passes, and in which the retainer can move freely as it is elongated or contracted. The eye-guides *e'* for the india-rubber retainers D' consist simply of rings, through which the rubber retainers pass, and in which they move freely as they are elongated or contracted. The eye-guides *e e'* may be attached to the leaf A in any suitable way; but I prefer to form the two eye-guides, which are coincident with each other on opposite sides of the leaf A, of a single piece of tube, or a single ring, which is flattened slightly and inserted through a slot, $c^2$, in the leaf, as best shown in Figs. 2 and 3. The single tube or ring, thus applied, serves as an eye-guide for two retainers—one on each side of the leaf A—and is held in place by the retainers passing through it. Eye-guides which surround the retainers, and through which the retainers move, are very advantageous. They may be made of metal, if desired, and so strong that they will never give way.

At the left hand of Fig. 1 I have shown a retainer which consists of a spiral spring, D, attached at one end, $d'$, to the leaf, and a cord, $D^2$, passing around a pulley, $f$, and having at its free end a hook, $c$. When the looped end of a snell is attached to the hook $c$, the spring D will be elongated in a downward direction, while the cord $D^2$ will be drawn upward. Eye-guides $e\ e'$ may be applied both to the spiral spring D and attached cord $D^2$, and by means of the spring, cord, and pulley I obtain a retainer capable of great elongation without lengthening the book.

The method of attaching the pulleys $f$ to the leaf is illustrated in Fig. 4, which shows a vertical section of the lower part of the leaf. A wire, $s$, is inserted through the leaf and clamped onto it, and the portions of this wire projecting laterally from the leaf on opposite sides serve as the journals for two pulleys—one on each side of the leaf—and the ends of the wire are turned over to prevent the pulleys from coming off the journals.

What I claim as my invention, and desire to secure by Letters Patent, is—

1. The combination, with the leaf of a fly-book having hooks or clips at one end and elastic or spring retainers at the other end, of eye-guides for the several retainers, each attached to the leaf and receiving a retainer through it, substantially as herein described.

2. The combination, with the leaf, of elastic or spring retainers on opposite sides thereof, and an eye-guide consisting of a tube or ring inserted through the leaf and receiving the two said retainers through its portions which are presented on opposite sides of the leaf, substantially as herein described.

3. The combination, with the leaf A, having hooks or clips $a$ at one end, of retainers, each consisting of the spring D and attached cord $D^2$, and a pulley, $f$, around which said cord passes, substantially as herein described.

CHANCELLOR G. LEVISON.

Witnesses:
 FREDK. HAYNES,
 ED. L. MORAN.